(12) United States Patent
Sakai et al.

(10) Patent No.: US 6,366,375 B1
(45) Date of Patent: Apr. 2, 2002

(54) OPTICAL-SIGNAL TRANSMISSION APPARATUS AND METHOD, AND SIGNAL PROCESSING APPARATUS

(75) Inventors: Kazuhiro Sakai; Tsutomu Hamada; Shinobu Ozeki; Masaki Hirota; Shinya Kyouzuka; Kenichi Kobayashi; Hiroki Ishida; Hiroshi Fujimagari; Masao Funada; Takashi Ozawa, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/186,374

(22) Filed: Nov. 5, 1998

(30) Foreign Application Priority Data

Nov. 10, 1997 (JP) .............................. 9-307383
Aug. 11, 1998 (JP) ............................ 10-226734

(51) Int. Cl.[7] ................................ H04J 14/00
(52) U.S. Cl. ................... 359/115; 359/124; 359/163
(58) Field of Search ................... 359/124, 115, 359/163

(56) References Cited

U.S. PATENT DOCUMENTS

| | | | | |
|---|---|---|---|---|
| 5,416,629 A | * | 5/1995 | Huber | 359/182 |
| 5,822,475 A | * | 10/1998 | Hirota et al. | 385/24 |
| 6,134,034 A | * | 10/2000 | Terahara | 359/124 |
| 6,172,783 B1 | * | 1/2001 | Funada et al. | 359/163 |

FOREIGN PATENT DOCUMENTS

| | | |
|---|---|---|
| JP | A-61-196210 | 8/1986 |
| JP | A-64-14631 | 1/1989 |
| JP | A-2-41042 | 2/1990 |
| JP | A-4-134415 | 5/1992 |
| JP | A-8-79186 | 3/1996 |
| JP | A-8-328707 | 12/1996 |
| JP | A-9-98137 | 4/1997 |

OTHER PUBLICATIONS

Uchida, Teiji. The 9th Science Lecture Meeting of Circuit Packaging Technology, 15C01, pp. 201–202.
Tomimuro, H., et al. "Packaging Technology for Optical Interconnects," *IEEE Tokyo*, No. 33, 1994, pp. 81–86.
Wada, O. *Electronics*, Apr. Issue, 1993, pp. 52–55.

* cited by examiner

*Primary Examiner*—Leslie Pascal
*Assistant Examiner*—Hanh Phan
(74) *Attorney, Agent, or Firm*—Oliff & Berridge, PLC (57) ABSTRACT

An optical-signal transmission apparatus and method for optical-signal transmission, or a signal processing apparatus for signal processing including optical-signal transmission. A number of terminals (circuit boards and the like) are connected, and communication can be freely performed among the terminals. A plurality of transmission nodes input optical signals having different light intensity levels into an optical transmission medium. A desired signal is separated and extracted from a multiplex signal where these optical signals transmitted from a reception node are overlaid.

13 Claims, 9 Drawing Sheets

OPTICAL-SIGNAL TRANSMISSION APPARATUS AND METHOD, AND SIGNAL PROCESSING APPARATUS

BACKGROUND OF THE INVENTION

The present invention relates to an optical-signal transmission apparatus and a method for optical signal transmission, and a signal processing apparatus for signal processing including optical signal transmission.

The function of a circuit board used in a data processing system (daughter board) is increasing by virtue of development of very large-scale integrated circuit (VLSI). With the increase in circuit function, the number of signals connected to respective circuit boards increases, and therefore, a parallel architecture requiring a number of connectors and connection lines is adopted as a data bus board (mother board) connecting the respective circuit boards (daughter boards) with a bus structure. The parallel architecture is developed by multilayered and miniaturized connection lines so as to improve the bus operation speed. However, signal delay due to capacity between connection wires and resistance of the connection wire lowers bus operation speed, and the system processing speed is restricted by the bus operation speed. Further, a problem occurs when the apparatus heats with increase in electric consumption. Further, as transmission-waiting time due to bus occupation influences the system processing speed, there is a need for simultaneous transmission among a plurality of circuit boards. Furthermore, the problems of EMI (Electromagnetic Interference) noise due to high-density bus-connection wiring seriously disturb improvement in the system processing speed.

That is, as the bus operation speed is limited, the number of the bus wires is increased in correspondence with increase in data transmission amount. However, as the number of wires increases, the electric consumption increases, further, transmission speed reduces due to skew between wires and further, there is a problem in wiring space. Japanese Published Unexamined Patent Application No. Sho 64-14631 and Hei 8-328707 disclose analog bus connection to reduce the number of wires among devices and facilitate wiring.

Figure 13:
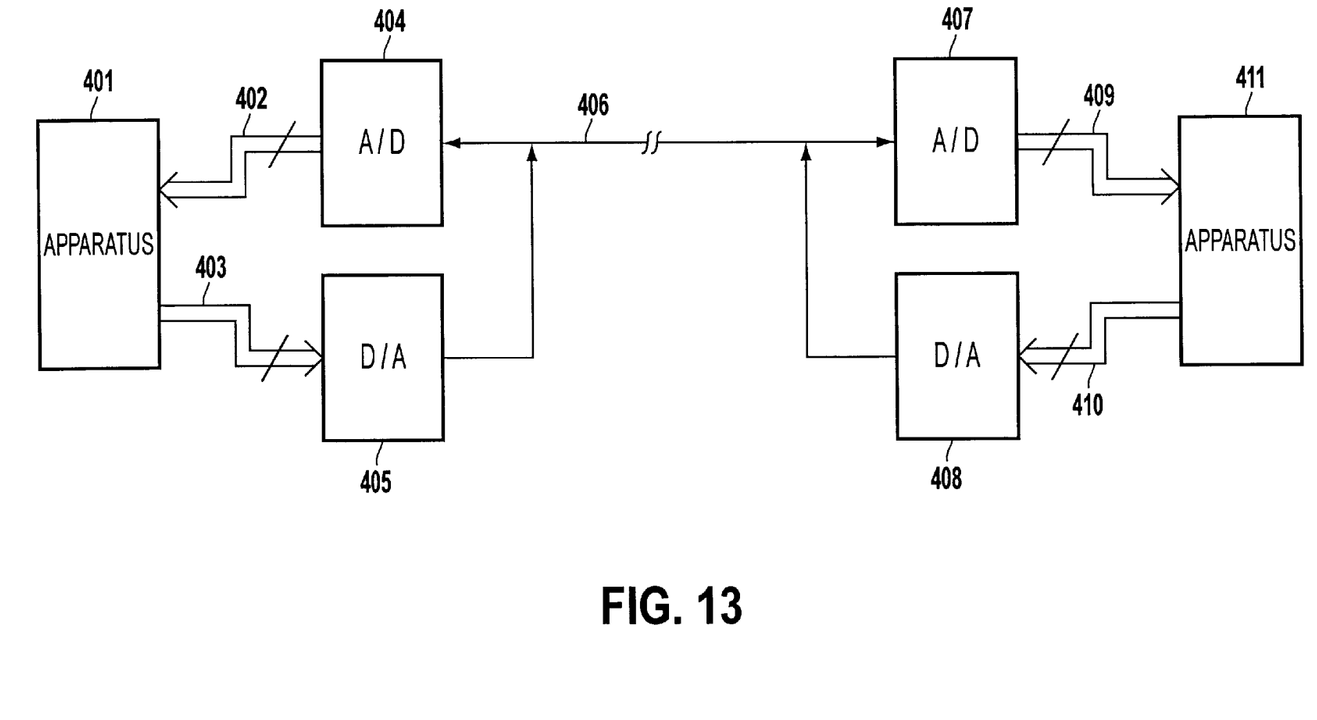
FIG. 13 is a block diagram showing an example of connection by an analog bus disclosed in Japanese Published Unexamined Patent Application No. Hei 8-328707.

FIG. 13 shows an example of the analog bus connection disclosed in Japanese Published Unexamined Patent Application No. Hei 8-328707.

Apparatuses 401 and 411 are interconnected by an analog bus 406 via two A/D converters 404 and 407 and two D/A converters 405 and 408.

An n-bit signal generated from the apparatus 401 is introduced via a transmission path 403 into the D/A converter 405, converted into analog data, and transmitted onto the analog bus 406. The data passed through the analog bus 406 is converted into an n-bit digital signal by the A/D converter 407, and transmitted via a transmission path 409 into the apparatus 411. On the other hand, a signal transmitted from the apparatus 411 is transmitted via a transmission path 410 into the D/A converter 408, converted into analog data, and transmitted onto the analog bus 406. The data passed through the analog bus 406 is converted into a digital signal by the A/D converter 404, and transmitted via a transmission path 402 into the apparatus 401.

As described above, the analog bus 406 operates with a multilevel analog signal, and the apparatuses 401 and 411 operate with a digital signal.

In the analog bus connection as described above, as the signal that passes through the analog bus 406 is a multilevel analog signal, level change occurs due to a bus-line resistive component, a leak current and the like. If the analog bus line is prolonged or a number of apparatuses are connected to the analog bus, data transmission cannot be accurately performed without difficulty.

Further, microcomputers and the like often use a plurality of buses in addition to connection with a number of functional blocks. In such case, as communication cannot be made among the plurality of buses, the above-described analog bus connection cannot be realized without difficulty. To solve this problem, Japanese Published Unexamined Patent Application No. Hei 8-328707 proposes a circuit to compensate the level change of analog bus. However, since an electric wire is used as the bus line, this is not a substantial solution of the problem to prevent the level change due to wiring resistance. Further, the problems of increase in electric consumption in case of high-speed bus drive and the skew of parallel wiring for large-capacity transmission cannot be solved. Further, in the case where the electric wire is used as the bus line, even if a multilevel-logic analog bus is employed, although simultaneous multiplex transmission can be performed in the same direction, bidirectional simultaneous multiplex transmission cannot be performed.

To realize high-speed transmission, utilization of an intra-system optical connection technique, i.e., so-called optical interconnection, instead of electric transmission technique is studied. The optical interconnection technique has been proposed by Teiji Uchidata (in The 9th Circuit Packaging Scientific Lecture Meeting), H. Tomimuro, et al., ("Packaging Technology for Optical Interconnects", IEEE Tokyo, No. 3, pp. 81–86, 1994), and Osamu Wada (Electronics 1993 April., pp. 52–55), as various applications in accordance with the content of system construction.

As one of the proposed various optical interconnection techniques, Japanese Published Unexamined Patent Application No. Hei 2-41042 discloses a data bus employing an optical data transmission method using high-speed and high-sensitivity light-emission/photoreception devices. In this example, a serial optical data bus for loop transmission between respective circuit boards is proposed. The circuit boards respectively have a light-emission/photoreception device on both front and rear surfaces, such that the light-emission/photoreception devices on adjacent circuit boards installed in a system frame are optically connected. In this method, signal light sent from one circuit board is photoelectric-converted by an adjacent circuit board, and the signal light is further electrolight-converted by the circuit board, and sent to the next adjacent circuit board. In this manner, the respective circuit boards, sequentially and serially arranged, transmit signal light through all the circuit boards by repeating photoelectric conversion and electrolight conversion. By this arrangement, the signal transmission speed depends on the conversion speed of the photoelectric conversion and electrolight conversion by the light-emission/photoreception devices on the circuit boards, and at the same time, is limited by the conversion speed. Further, as data transmission among the circuit boards is made by using optical connection via free space by the light-emission/photoreception devices on the respective circuit boards, all the circuit boards must be optically positioned with the light-emission/photoreception devices on both front and rear surfaces of the circuit boards and the circuit boards must be optically connected. Further, as the optical connection is made via the free space, interference (cross talk) occurs between adjacent optical transmission paths, which may disturb data transmission. Further, data transmission failure might occur by scattering of signal light due to conditions within the system such as dust. Further, as the respective circuit boards are serially arranged, the connection is released if any of the boards is removed, and a spare circuit board to compensate for the lack of removed is required. That is, the circuit boards cannot be freely added or removed, and the number of circuit boards is fixed.

Japanese Published Unexamined Patent Application No. Sho 61-196210 discloses a data transmission technique among circuit boards utilizing a two-dimensional array device. According to this technique, a plate is provided opposing to a light source having two parallel surfaces, and circuit boards are optically connected via a light path formed by a diffraction grating and a reflection device provided on the plate. However, this method merely connects light emitted from one point to one fixed point, and cannot connect all the circuit boards as in the above-described electric bus. Further, as a complicated optical system is required and positioning is difficult, interference (cross talk) may occur between adjacent optical data transmission paths due to positional shift of optical devices, which may cause data transmission failure. Further, as the connection information between circuit boards is determined by the diffraction grating and the reflection device on the plate surface, the circuit boards cannot be freely added or removed resulting in low extensibility of the system.

Japanese Published Unexamined Patent Application No. Hei 4-134415 discloses another data transmission between circuit boards utilizing the two-dimensional array device. According to this technique, a system which comprises a lens array of a plurality of lenses having a negative curvature formed on the surface of transparent material having a refractive index higher than that of air, and an optical system for introducing light which is generated from a light source from the side surface of the lens array, is provided in the transparent material. Further, there is also disclosed another system having a region of low refractive index or a hologram instead of the plurality of lenses having the negative curvature. In this method, light that enters from the side surface is diffused by the plurality of lenses, the region of low refractive index or the hologram, on the surface, and emitted. Accordingly, the intensity of output signal may vary in correspondence with the relation between the entrance position and emission positions on the surface with the plurality of lenses, the low refractive-index region or the hologram. Further, as optical input devices of circuit boards must be provided at the positions of the plurality of lenses having negative curvature, the low refractive-index region or the hologram, there is no freedom in arrangement of the circuit boards resulting in low extensibility of the system. As a means of solving these problems, a sheet-shaped optical data bus which transmits diffused signal light is considered. In use of this sheet-shaped optical data bus, the number of circuit boards is not limited, unlike the method in Japanese Published Unexamined Patent Application No. Hei 2-41042, further, the difficulty in optical positioning of the light-emission/photoreception devices as in Japanese Published Unexamined Patent Application No. Sho 61-196210 can be solved.

However, all of the above-described optical transmission methods merely convert a signal from an electronic circuit into an optical signal and transmit the converted optical signal, and are seriously limited by the electronic circuits.

Further, Japanese Published Unexamined Patent Application No. Hei 9-98137 discloses bidirectional communication via an optical fiber using optical signals having different wavelengths.

However, in this method, even though the bidirectional communication is made via the same optical fiber, the communicable range is limited between terminals with light-emitting devices and photoreception devices for transmitting and receiving light of one wavelength. To freely perform communication among a number of terminals, a plurality of light-emitting devices and photoreception devices must be provided in the respective terminals for handling light having various wavelengths, which complicates the apparatus's structure and increases the cost.

That is, a technique to reduce the number of wires among terminals so as to facilitate wiring and to freely perform communication among a number of terminals has not been applied in any of electronic circuits and optical circuits.

SUMMARY OF THE INVENTION

The present invention has been made to solve the above problems, and has its object to provide an optical-signal transmission apparatus and a method which connect a number of terminals (apparatuses, circuit boards and the like) and freely perform communication among the plurality of terminals, and a signal processing apparatus using the optical-signal transmission method.

According to one aspect of the present invention, the foregoing object is attained by providing an optical-signal transmission apparatus comprising:

an optical transmission medium that transmits an optical signal, having a plurality of transmission nodes to input signal light into the optical transmission medium and at least one reception node to output an optical signal from the optical transmission medium;

a plurality of optical-signal transmission units, provided in correspondence with the respective transmission nodes, that respectively generate an optical signal and input the generated optical signal from the corresponding transmission node into the optical transmission medium, and generate pulse string optical signals having different light intensity levels among a plurality of optical-signal transmission units; and an optical-signal reception unit, provided in correspondence with the reception node, that obtains a reception signal by obtaining the optical signal transmitted from the reception node, and separates a signal component corresponding to an optical signal generated by a desired optical-signal transmission unit, from among a plurality of signal components corresponding to the plurality of optical signals generated by the optical-signal transmitting units, included in the obtained reception signal.

Further, according to another aspect of the present invention, the foregoing object is attained by providing an optical-signal transmission apparatus comprising:

an optical transmission medium that transmits signal light, having at least one transmission node to input signal light into the optical transmission medium and a plurality of reception nodes to output signal light from the optical transmission medium;

an optical-signal transmission unit, provided in correspondence with the transmission node, that generates a plurality of pulse string optical signals having different light intensity levels or generates a multiplex pulse string optical signal where a plurality of pulse string optical signals having different light intensity levels are overlaid, and inputs the optical signals or multiplex optical signal from the corresponding transmission node into the optical transmission medium; and an optical-signal reception unit, provided in correspondence with the respective reception nodes, that obtains a reception signal by obtaining the optical signals or multiplex optical signal transmitted from a corresponding reception node, separates a signal component corresponding to an optical signal generated by a desired optical-signal transmission unit, from among a plurality of signal components corresponding to the plurality of optical signals generated by the optical-signal transmitting unit, included in the obtained reception signal.

In the optical-signal transmission apparatus according to the second aspect of the present invention, in a case where the optical-signal transmission unit generates a multiplex pulse string optical signal where a plurality of pulse string optical signals having different light intensity levels are overlaid, any process may be used for finally obtaining the multiplex pulse string optical signal. For example, the multiplex pulse string optical signal may be obtained by generating a multiplex pulse string electric signal where a plurality of pulse string electric signals having different signal intensity levels and converting the multiplex pulse string electric signal into an optical signal. Alternatively, the multiplex pulse string optical signal may be obtained by converting a plurality of pulse string electric signals having different signal intensity levels into pulse string optical signals and overlaying the pulse string optical signals.

Further, according to another aspect of the present invention, the foregoing object is attained by providing an optical-signal transmission method comprising the steps of:

simultaneously introducing a plurality of optical signals having different light intensity levels or a multiplex optical signal where a plurality of optical signals having different light intensity levels are overlaid into an optical transmission medium that transmits signal light;

obtaining a reception signal by receiving the optical signals or multiplex optical signal transmitted from the optical transmission medium; and separating a signal component corresponding to a desired optical signal from the reception signal.

Further, according to another aspect of the present invention, the foregoing object is attained by providing a signal processing apparatus comprising:

an optical transmission medium that transmits signal light, having a plurality of transmission nodes to input signal light into the optical transmission medium and at least one reception node to output an optical signal from the optical transmission medium;

a first circuit board sharedly carrying a plurality of optical-signal transmission units that respectively emit an optical signal, and generate a plurality of pulse string optical signals having different light intensity levels for respective optical-signal transmission units;

a second circuit board sharedly carrying a plurality of optical-signal reception units that obtain a reception signal by receiving the optical signals or multiplex optical signal, and separate a signal component corresponding to an optical signal generated by a desired optical-signal transmission unit, from among a plurality of signal components corresponding to the plurality of optical signals generated by the plurality of optical-signal transmission units, included in the obtained reception signal;

a support member that supports the first circuit board and the second circuit board positioned with respect to the optical transmission medium such that the optical signals generated from the optical-signal transmission units on the first circuit board are introduced from the transmission nodes into the optical transmission medium and signal light transmitted from the reception node is transmitted into the optical-signal reception unit on the second circuit board.

Further, according to another aspect of the present invention, the foregoing object is attained by providing a signal processing apparatus comprising:

an optical transmission medium that transmits signal light, having at least one transmission node to input signal light into the optical transmission medium and a plurality of reception nodes to output signal light from the optical transmission medium;

a first circuit board carrying an optical-signal transmission unit that simultaneously generates a plurality of pulse string optical signals having different light intensity levels or a multiplex pulse string optical signal where a plurality of pulse string optical signals having different light intensity levels are overlaid, and outputs the optical signals or multiplex optical signal;

a second circuit board carrying a plurality of optical-signal reception units that obtain a reception signal by receiving the optical signals or multiplex optical signal, and separate a signal component corresponding to a desired optical signal from among a plurality of signal components corresponding to the plurality of optical signals, included in the obtained reception signal;

a support member that supports the first circuit board and the second circuit board positioned with respect to the optical transmission medium such that the optical signals generated from the optical-signal transmission unit on the first circuit board are introduced from the transmission node into the optical transmission medium and the signal light transmitted from the reception nodes is transmitted into the optical-signal reception units on the second circuit board.

Other features and advantages of the present invention will be apparent from the following description taken in conjunction with the accompanying drawings, in which reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
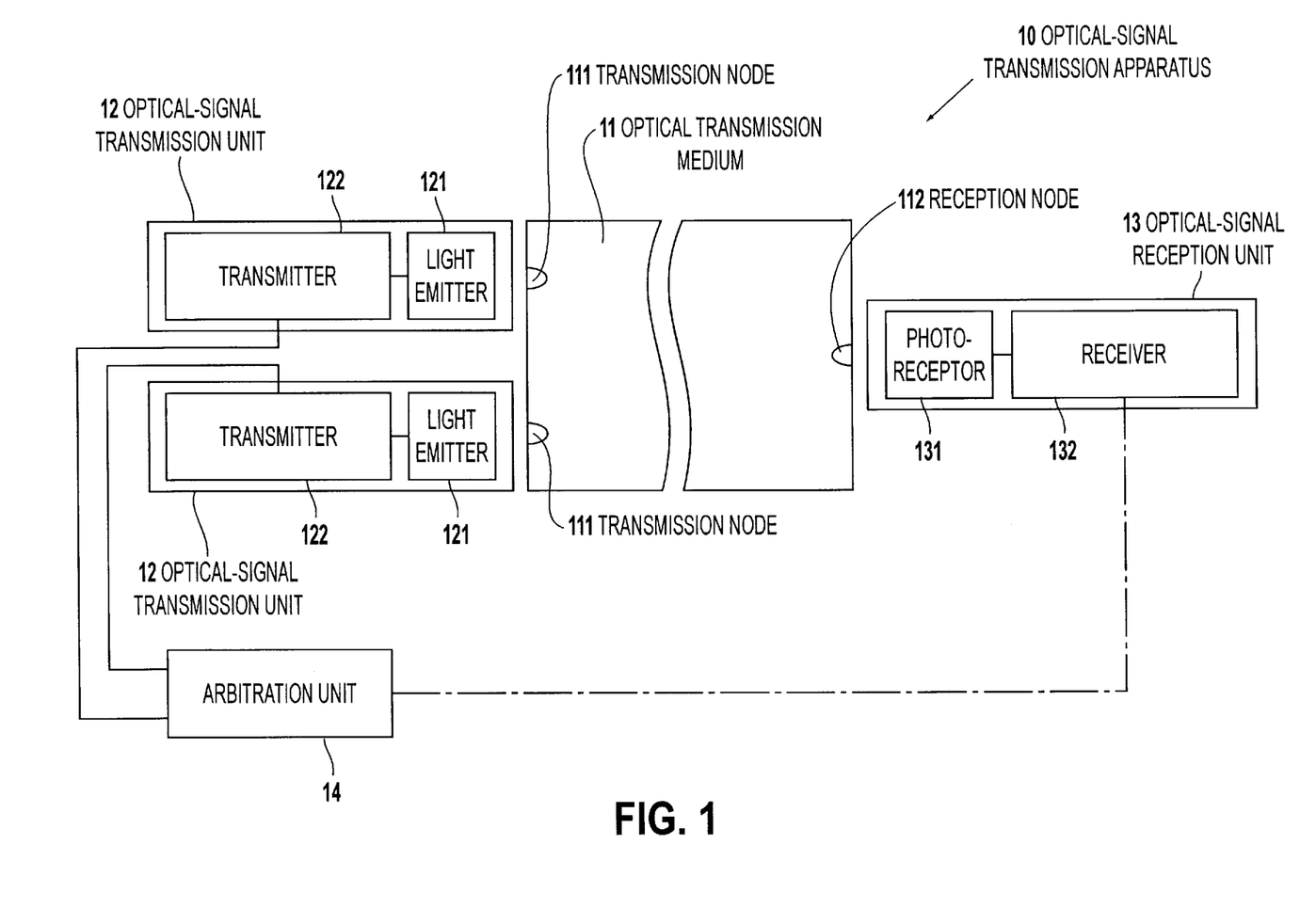
FIG. 1 is a block diagram showing the construction of an optical-signal transmission apparatus using the optical-signal transmission method of the present invention, according to a first embodiment of the present invention.

FIG. 1 is a block diagram showing the construction of an optical-signal transmission apparatus using an optical-signal transmission method of the present invention, according to a first embodiment of the present invention.

In FIG. 1, an optical-signal transmission apparatus 10 has an optical transmission medium 11, a plurality of (two in FIG. 1) optical-signal transmission units 12, one optical-signal reception unit 13, and an arbitration unit 14.

The optical transmission medium 11 has a plurality of (two in FIG. 1) transmission nodes 111 for introducing signal light into the optical transmission medium 11 on one optical transmission end (the left end of the optical transmission medium 11 in FIG. 1), and a reception node 112 for transmitting an optical signal transmitted through the optical transmission medium 11 on the other optical transmission end (the right end of the optical transmission medium 11 in FIG. 1). The optical transmission medium 11 transmits the optical signals introduced from the transmission nodes 111 to the reception node 112, and outputs the signals from the reception node 112.

Further, the optical-signal transmission units 12, provided in correspondence with the respective transmission nodes 111, respectively generate an optical signal and input the generated optical signal from the corresponding transmission nodes 111 into the optical transmission medium 11. The optical-signal transmission units 12 respectively have a light emitter 121 for generating an optical signal, and a transmitter 122 for generating an electric signal as a base of the optical signal generated from the light emitter 121 and transmitting the electric signal to the light emitter 121. The transmitter 122 generates a pulse string electric signal and inputs the pulse string electric signal into the light emitter 121. The light emitter 121 outputs a pulse strings optical signal based on the pulse string electric signal.

In the present embodiment, a plurality of (two in FIG. 1) optical-signal transmission units 12 are provided, and the plurality of light emitters 121 of the optical-signal transmission units 12 output pulse string optical signals having light intensity levels different from each other. When the respective light emitters 121 output the optical signals having different light intensity levels, the light intensity levels of optical signals by the respective light emitters 121 may be fixedly determined, however, it may be arranged such that the respective optical-signal transmission units 12 can freely change the light intensity levels of optical signals generated in the optical-signal transmission units, and as shown in FIG. 1, an arbitration unit 14 may be provided to perform arbitration among the plurality of optical-signal transmission units 12 such that the light intensity levels of the optical signals are different from each other.

In FIG. 1, the number of the optical-signal transmission units 12 is only two, and it may be arranged such that the light intensity levels of optical signals generated from the respective optical-signal transmission units 12 are set to predetermined levels in advance. However, if the number of optical-signal transmission units is increased, it is rather advantageous to provide the arbitration unit 14 to assign light intensity levels, sequentially from the best level, in consideration of electric consumption or S/N ratio and the like, than to fixedly set the light intensity levels of optical signals generated from the respective optical-signal transmission units.

Regarding the relation between the number of optical-signal transmission units and the light intensity levels of optical signals, the number of light intensity levels equals the number of optical-signal transmission units, or the number of light intensity levels is less than that of optical-signal transmission units.

The respective signal light generated from the light emitters 121 of the respective optical-signal transmission units 12 are intriduced from the respective transmission nodes 111 into the optical transmission medium 11, and transmitted through the optical transmission medium 11 from the reception node 112.

The optical-signal reception unit 13 is provided in correspondence with the reception node 112. The optical signals transmitted from the reception node 112 are transmitted into a photoreceptor 131 in the optical-signal reception unit 13, and converted into an electric reception signal. Then, a receiver 132 separates a signal component corresponding to an optical signal generated by a desired one of optical-signal transmission units 12, included in the reception signal obtained by the photoreceptor 131.

Figure 2:
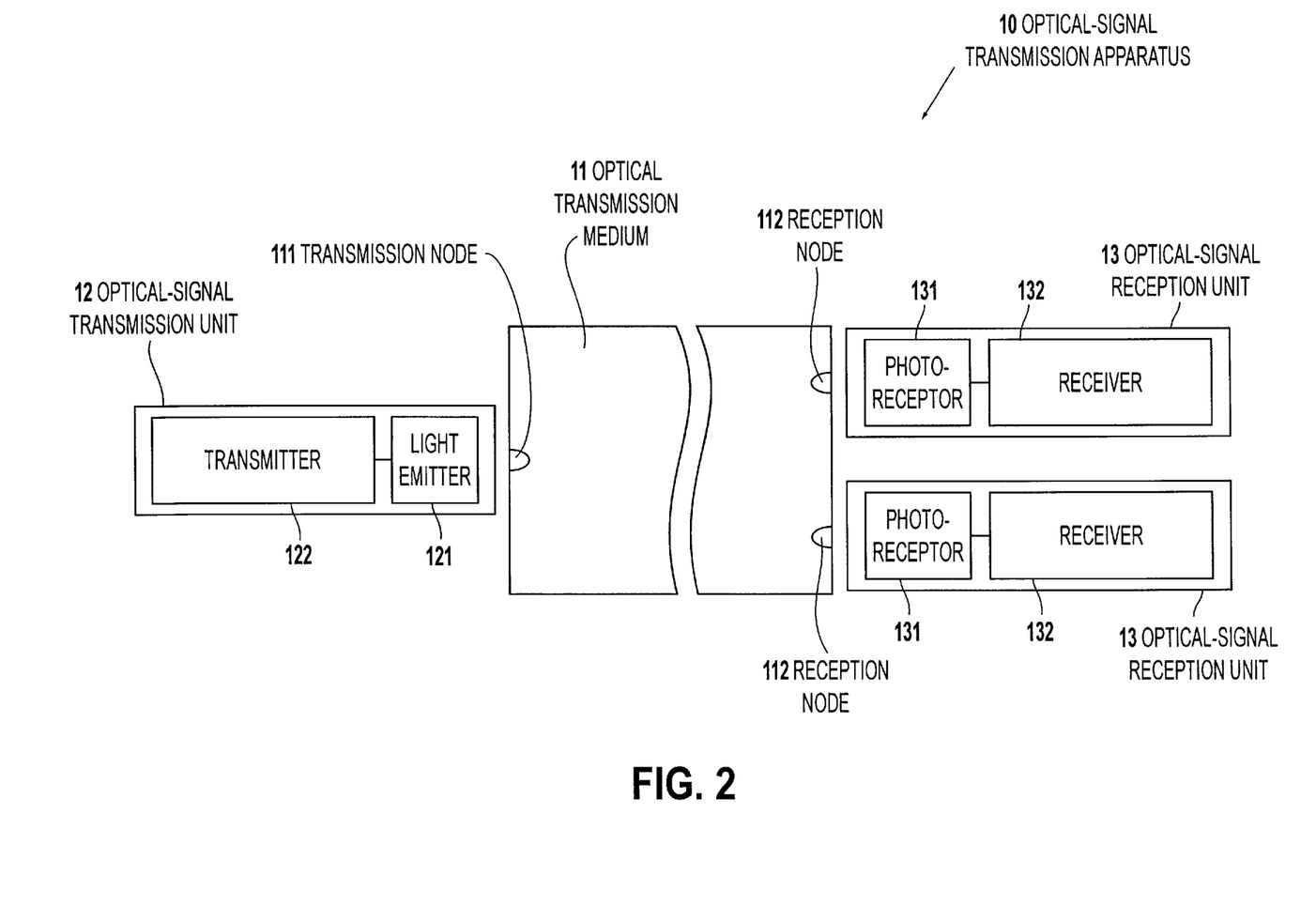
FIG. 2 is a block diagram showing the construction of the optical-signal transmission apparatus using the optical-signal transmission method of the present invention, according to a second embodiment of the present invention.

FIG. 2 is a block diagram showing the construction of the optical-signal transmission apparatus using the optical-signal transmission method of the present invention, according to a second embodiment of the present invention.

In FIG. 2, the optical-signal transmission apparatus 10 has the optical transmission medium 11, one optical-signal transmission unit 12, and a plurality of (two in FIG. 2) optical-signal reception units 13.

The optical transmission medium 11 in the optical-signal transmission apparatus 10 in FIG. 2 has one transmission node 111 for introducing signal light to the optical transmission medium 11 on one optical transmission end (the left end of the optical transmission medium 11 in FIG. 2), and a plurality of (two in FIG. 2) reception nodes 112 for transmitting the optical signal transmitted through the optical transmission medium 11 on the other optical transmission end (the right side end in FIG. 2). The optical transmission medium 11 transmits the optical signal transmitted from the transmission node 111 to the respective reception nodes 112, and outputs the optical signals from the reception nodes 112.

Further, the optical-signal transmission unit 12, provided in correspondence with the transmission node 111, generates an optical signal and inputs the generated optical signal from the corresponding transmission node 111 into the optical transmission medium 11. Similarly to the first embodiment in FIG. 1, the optical-signal transmission unit 12 has the light emitter 121 which outputs an optical signal and the transmitter 122 which generates an electric signal as a base of the optical signal and transfers the electric signal to the light emitter 121. However, in FIG. 2, the transmitter 122 generates a plurality of pulse signals having signal levels different from each other in parallel, or generates a multiplex pulse signal where a plurality of pulse signals having signal levels different from each other are overlaid, and inputs the plurality of pulse signals or the multiplex pulse signal into the light emitter 121. The light emitter 121 generates a plurality of pulse string optical signals or multiplex pulse string optical signal based on the input electric signal(s).

Regarding the relation between the number of optical-signal reception units and that of intensity levels of optical signals, the number of light intensity levels may equal that of optical-signal reception units, or the number of light intensity levels may be less than that of the optical-signal reception units.

Further, in the present embodiment in FIG. 2, the optical-signal reception units 13 are provided in correspondence with the plurality (two in FIG. 2) of reception nodes 112. The optical-signal reception units 13 have the same function as that of the optical-signal reception unit 13 in FIG. 1.

Hereinbelow, the first embodiment in FIG. 1 will be described in detail. The following description can also be used for explaining the second embodiment shown in FIG. 2 as long as the characteristic of the first embodiment is not changed. Further, the feature of the second embodiment as shown in FIG. 2 will be described later.

Figure 3A:
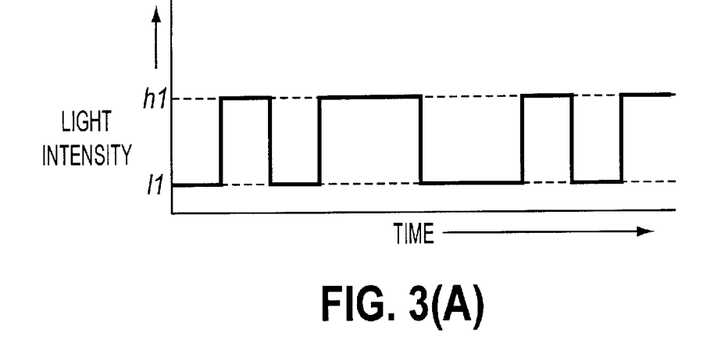
FIGS. 3A and 3B are graphs showing waveforms of optical signals introduced into an optical transmission medium from two transmission nodes.
Figure 3B:
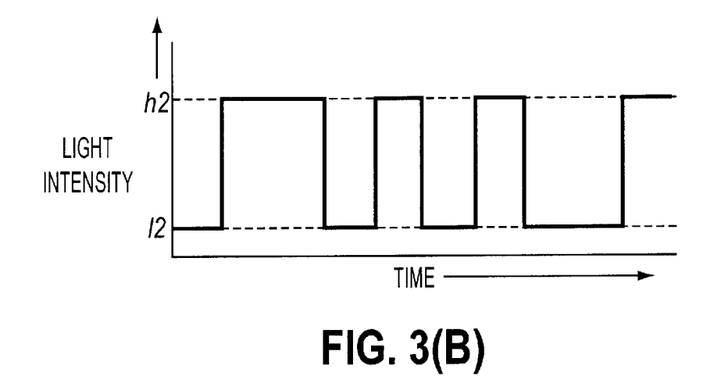
Figure 4:
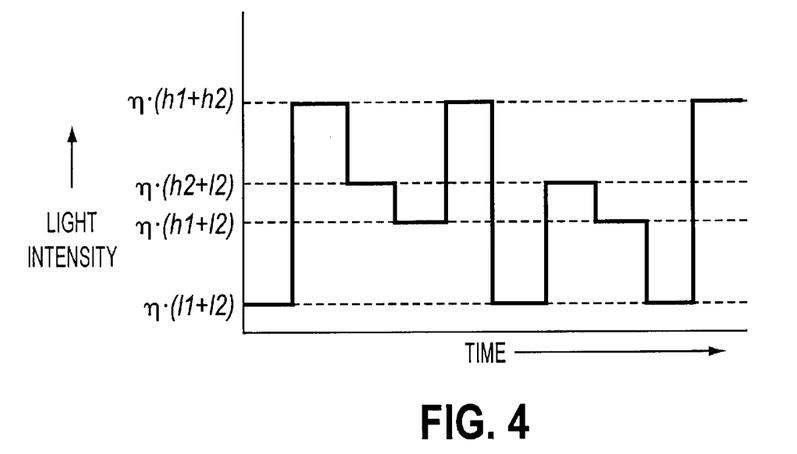
FIG. 4 is a graph showing a waveform of an optical signal transmitted from a reception node.

FIGS. 3A and 3B are graphs showing waveforms of optical signals introduced into the optical transmission medium from two transmission nodes 111. FIG. 4 is a graph showing a waveform of an optical signal transmitted from the reception node 112.

The light intensity levels of the "1" level optical signals at the respective transmission nodes 111 are respectively "h1" and "h2" (h1≠h2). Further, the light intensity levels of the "0" level optical signals are respectively "11" and "12". As shown in FIG. 4, the reception node 112 receives a signal waveform which consist of the two optical signals shown in FIG. 3 are added in the optical transmission medium 11.

To obtain the light intensity of received signal in more detail, it is necessary to consider the optical transmission efficiency in the optical transmission medium 11, the respective combining efficiencies in the transmission nodes 111 and the reception node 112, the difference among efficiencies of the respective nodes, and the like. In this embodiment, variation at each node is ignored. Let $\eta$ be the total optical-signal transmission efficiency between the point where the optical signal is generated from the light emitter 121 of the optical-signal transmission unit 12 and the point where the optical signal is received by the photoreceptor 131 of the optical-signal reception unit 13, then the relation between the optical signals introduced from two transmission nodes (A, B) and the optical signal transmitted from the reception node is represented as the following logical table in Table 1.

TABLE 1

|  |  | Transmission Node A | |
| --- | --- | --- | --- |
|  |  | logic "0" | logic "1" |
| Transmission Node B | logic "0" | $\eta \cdot (l1 + l2)$ | $\eta \cdot (h1 + l2)$ |
|  | logic "1" | $\eta \cdot (h2 + l1)$ | $\eta \cdot (h1 + h2)$ |

Further, assuming that l1+l2=0 holds since the light intensity levels l1 and l2 of the "0" level optical signal can be actually ignored, the table 1 can be simplified as represented as the following logical table 2.

TABLE 2

|  |  | Transmission Node A | |
| --- | --- | --- | --- |
|  |  | logic "0" | logic "1" |
| Transmission Node B | logic "0" | 0 | $\eta \cdot h1$ |
|  | logic "1" | $\eta \cdot h2$ | $\eta \cdot (h1 + h2)$ |

As shown in these logical tables, by setting in advance the light intensity levels of signals to be received by the reception nodes, a desired signal can be easily discriminated from a signal obtained by adding these signals. More specifically, a desired signal is discriminated as follows.

Figure 5:
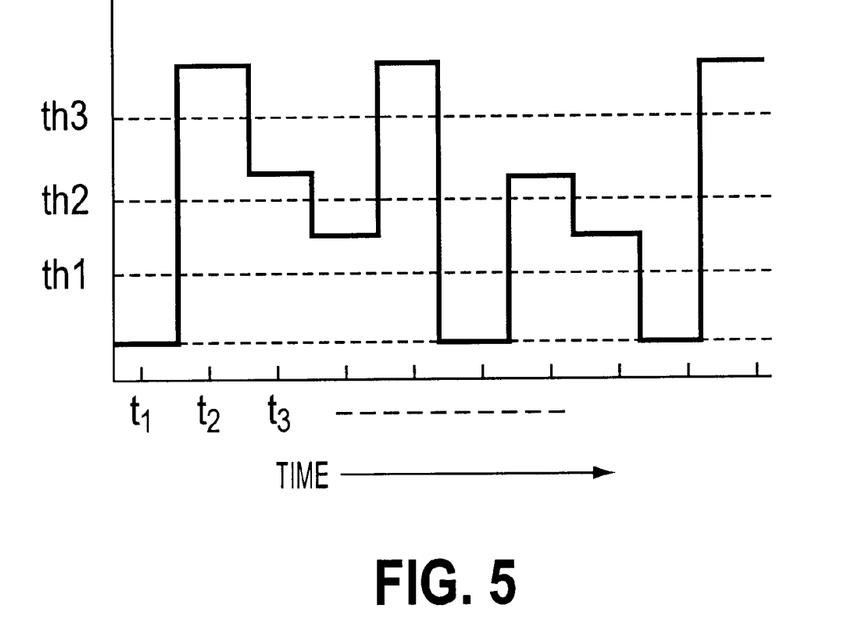
FIG. 5 is a graph for explaining signal discrimination processing by a receiver of an optical-signal reception unit.

FIG. 5 is a graph for explaining signal discrimination processing by the receiver 132 of the optical-signal reception unit 13 in FIG. 1.

The photoreceptor 131 obtains a time-sequential signal having a signal level which changes at respective time points $t_1$, $t_2$, $t_3$, ..., then the optical-signal reception unit 13 compares the time-sequential respective signal levels of the reception signal with a plurality of threshold values (three threshold values th1, th2 and th3 in the present embodiment). As a signal level St at a time point ti, if ($S_t$>th3) holds or if ($S_t$>th1) and ($S_t$<th2) hold, the optical signal is classified as the logic "1" optical signal introduced from the transmission node A, while if ($S_t$>ht2) holds, the optical signal is classified as the logic "1" optical signal introduced from the transmission node B. In this manner, a desired pulse signal is separated and extracted from the large amount of pulse signal as shown in FIG. 5.

In the above embodiment, for the sake of simplification, an optical-signal waveform having two types of light intensity levels has been described, however, if three or more transmission nodes 111 and optical-signal transmission units 12 are provided, and the light intensity levels are three or more, three or more types of optical signals can be simultaneously transmitted, and a desired signal can be separated and extracted from a reception signal.

In FIG. 1, when one of the plurality of optical-signal transmission units 12 starts transmission, the unit inquires the arbitration unit 14 about an available intensity level. The arbitration unit 14 notifies the optical-signal transmission unit 12 of a light intensity level, which is not currently used. The optical-signal transmission unit 12 receives the light intensity level, and notifies the light intensity level (h1 in this example) notified by the arbitration unit 14 and a code signal RF1 indicating the originator of the communication. In the present embodiment, the transmission of the code signal RF1 is transmitted as an optical signal similar to an optical signal following the code signal. The optical-signal reception unit 13 receives the code signal RF1, and determines from the code signal RF1 that the optical signal at the light intensity level h1 is transmitted from the optical-signal transmission unit 12. FIG. 1 shows only one reception node 112 and only one optical-signal reception unit 13, however, in a case where a plurality of reception nodes and a plurality of optical-signal reception units are provided, the code signal RF1 indicates the receiver of the communication as well as the light intensity level and the communication originator, and each respective optical-signal reception unit determines whether or not the unit is to receive the optical signal, based on the code signal.

Note that in this embodiment, the code signal is an optical signal, however, usually, this code signal has a small amount of information and does not require high-speed transmission, accordingly, an electric-signal transmission bus or a communication line similar to the conventional bus or communication line may be provided to send the code as an electric signal. For example, FIG. 1 shows an alternate long and short dashed line connecting the arbitration unit 14 to the optical-signal reception unit 13. The arbitration unit 14 may notify an optical-signal transmission unit, which has inquired about the light intensity level of an optical signal used in communication, of an available light intensity level, and transmits information which specifies the light intensity level and the communication originator to the optical-signal reception unit 13 via the electric-signal path represented by the alternate long and short dashed line.

Further, another optical transmission path may be provided in addition to the optical transmission medium 11, and the code signal may be transmitted via the optical transmission path.

Regarding the second embodiment as shown in FIG. 2, the explanations of FIGS. 3 to 5 will be made as follows.

The two optical signals shown in FIG. 3 are two optical signals (see FIG. 6 to be described later) simultaneously generated from one light emitter 121 in FIG. 2. The two optical signals introduced from one transmission node 111 into the optical transmission medium 11, and the optical signals are overlaid and transmitted to the two reception nodes 112.

Otherwise, a multiplex pulse string optical signal where two pulse signals as shown in FIG. 4 (see FIG. 7 to be described later) are overlaid is generated from the one light emitter 121 in FIG. 2, then the multiplex pulse string optical signal is introduced from the transmission node 111 into the optical transmission medium 11, and transmitted to the reception nodes 112. The other operations in the second embodiment are similar to those in the first embodiment as shown in FIG. 1.

Figure 6:
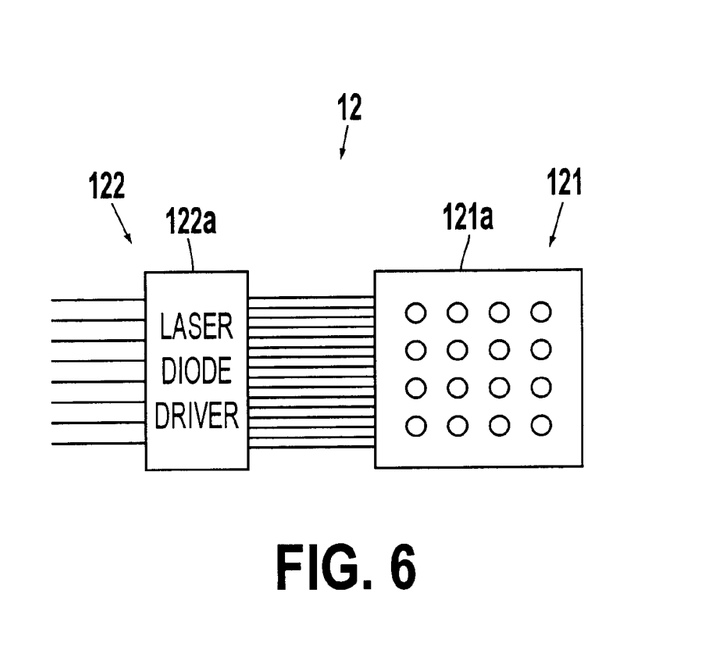
FIG. 6 is a schematic diagram showing an example of the optical-signal transmission unit.

FIG. 6 is a schematic diagram showing an example of the optical-signal transmission unit.

In FIG. 6, the optical-signal transmission unit 12 has a laser diode array 121a as the light emitter 121, and a laser diode driver 122a as the transmitter 122.

Assuming that the wire on the left side of the laser diode driver 122a requires data transmission, as the laser diode driver 122a is informed of the light intensity level currently used within the optical transmission medium, the laser diode driver 122a selects a light intensity level RF different from the light intensity level being used in the optical transmission medium. If the selected light intensity level is for two laser diodes, the laser diode driver 122a supplies data as one signal to two of drivers for driving laser diodes in the laser diode driver 122a. Accordingly, the two of the laser diodes in the laser diode array 121a emit light, and data transmission is performed at the light intensity for two laser diodes. In this arrangement, one optical-signal transmission unit can select a plurality of light intensity levels upon transmission. Further, one transmission node can perform optical transmission at different signal levels simultaneously. For example, if the laser diode driver 122a receives a data-transmission request different from current data transmission, the laser diode driver 122a selects a light intensity level RF different from the already-used light intensity levels, including the intensity level of its own transmission. For example, if the laser diode driver 122a selects a light intensity level for four laser diodes, the laser diode driver 122a supplies data as one signal to four drivers in the laser diode driver 122a. Accordingly, the four laser diodes in a laser diode array 121a emit light, and data transmission is performed at the light intensity level for four laser diodes. In this manner, if the transmission node has a plurality of transmission sources (laser diodes) and selects the number of transmission sources to be operated, the transmission node can simultaneously transmit different signal data at different light intensity levels. In this example, the laser diode array 121a is employed, however, an LED array or the like may be used. The optical-signal transmission unit in FIG. 6 can be employed in the first embodiment shown in FIG. 1 and the second embodiment shown in FIG. 2.

Figure 7:
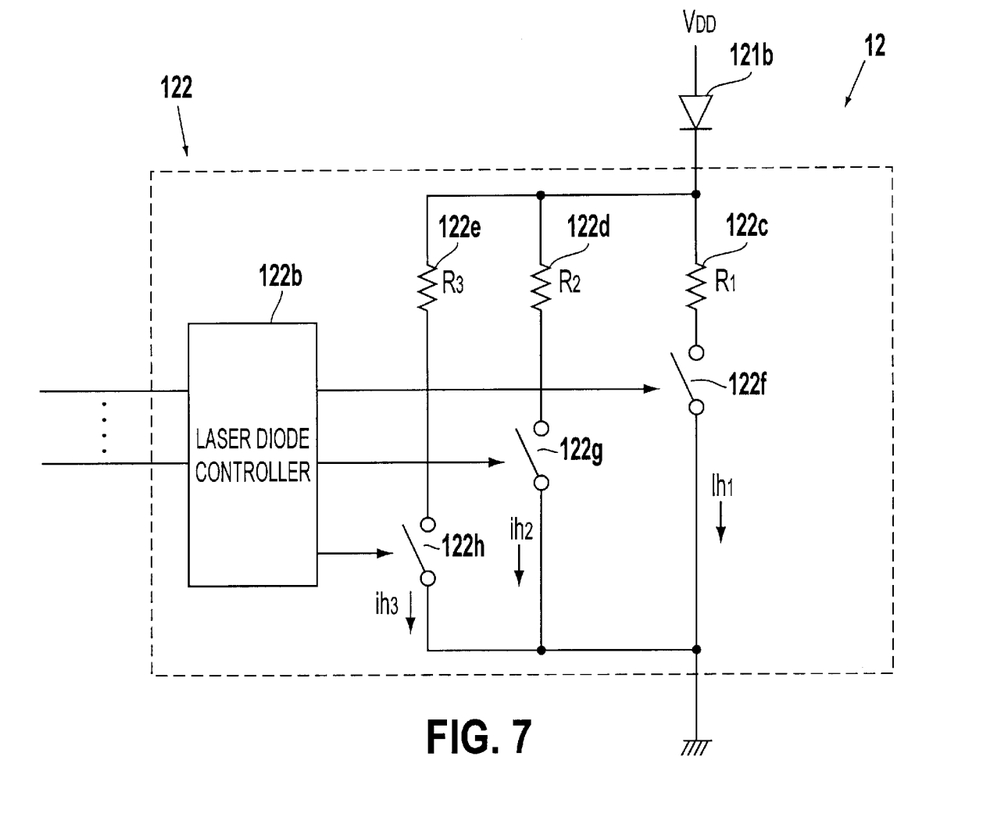
FIG. 7 is a block diagram showing another example of the optical-signal transmission unit.

FIG. 7 is a block diagram showing another example of the optical-signal transmission unit.

The optical-signal transmission unit 12 in FIG. 7 has one laser diode 121b as the light emitter 121. Further, the transmitter 122 has three resistors 122c, 122d and 122e, switching devices 122f, 122g and 122h serially connected to the respective resistors 122c, 122d and 122e, and a laser diode controller 122b for on-off controlling the switching devices 122f, 122g and 122h.

At the resistor 122c, a resistance value R1 is set such that when the switching device 122f is turned on, a current ih1 flows via the laser diode 121b, the resistor 122c and the switching device 122f to cause the laser diode 121b to emit an optical signal at the light intensity level h1. Similarly, a resistance value R2 of the resistor 122d is set such that when the switching device 122g is turned on, a current ih2 flows via the laser diode 121b, the resistor 122d and the switching device 122g to cause the laser diode 121b to emit an optical signal at the light intensity level h2. Further, a resistance value R3 of the resistor 122e is set such that when the switching device 122h is turned on, a current ih3 flows via the laser diode 121b, the resistor 122e and the switching device 122h to cause the laser diode 121b to emit an optical signal at the light intensity level (h1+h2).

When a plurality of signal transmission requests for transmitting, e.g., a signal as shown in FIG. 3A and a signal as shown in FIG. 3B, are issued from the wire on the left side of the laser diode controller 122b, the switching devices 122f, 122g and 122h are turned on/off based on these signals. Then, the laser diode 121b emits an optical signal having a waveform where the signal shown in FIG. 3A and the signal shown in FIG. 3B are overlaid, i.e., a multiplex pulse string optical signal as shown in FIG. 4. In this manner, by turning on/off the three switching devices 122f, 122g and 122h, a multiplex pulse signal is introduced into the laser diode 121b, and a pulse string optical signal having different light intensity levels is emitted.

The optical-signal transmission unit in FIG. 7 is also available in the first embodiment shown in FIG. 1 and the second embodiment shown in FIG. 2.

Figure 8:
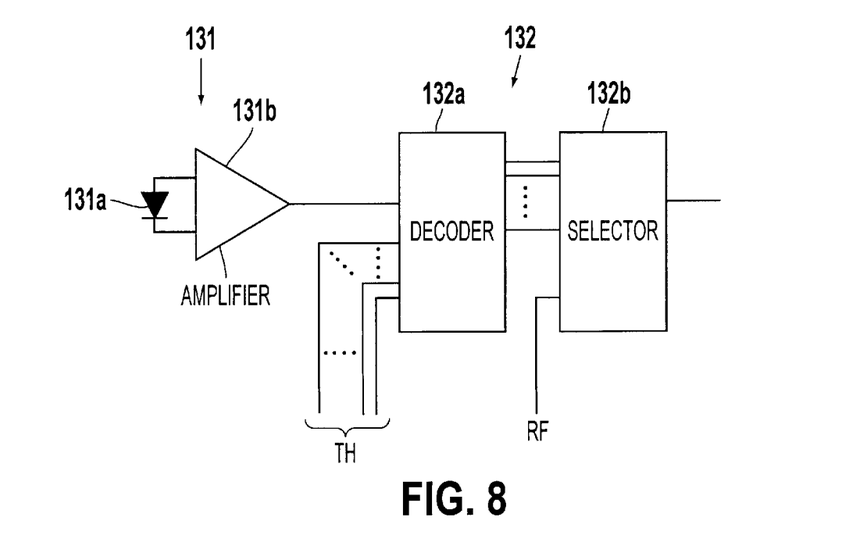
FIG. 8 is a block diagram showing an example of the optical-signal reception unit.

FIG. 8 is a block diagram showing an example of the optical-signal reception unit.

FIG. 8 shows the photoreceptor 131 comprising a photoreception device 131A and an amplifier 131B, and a receiver 132 having a decoder 132A and a selector 132B.

An output from the photoreception device 131A is introduced into the decoder 132B via the amplifier 131B. the decoder 132A compares the input signal with comparison data based on a pre-set plural threshold values TH, and outputs code signals as logic signal levels obtained from the above-described logical table 2. The selector 132B selects a signal to be received based on the plurality of logic signal levels and an intensity signal code RF to be extracted as a reception signal, in accordance with the logic described in FIG. 5. By using the selector 132B, an original signal can be transmitted.

Hereinbelow, various embodiments other than the first and second embodiments above will be described. In the following embodiments, regarding optical-signal transmission and reception, the optical-signal transmission and reception in the first embodiment and those in the second embodiment are implemented.

Figure 9:
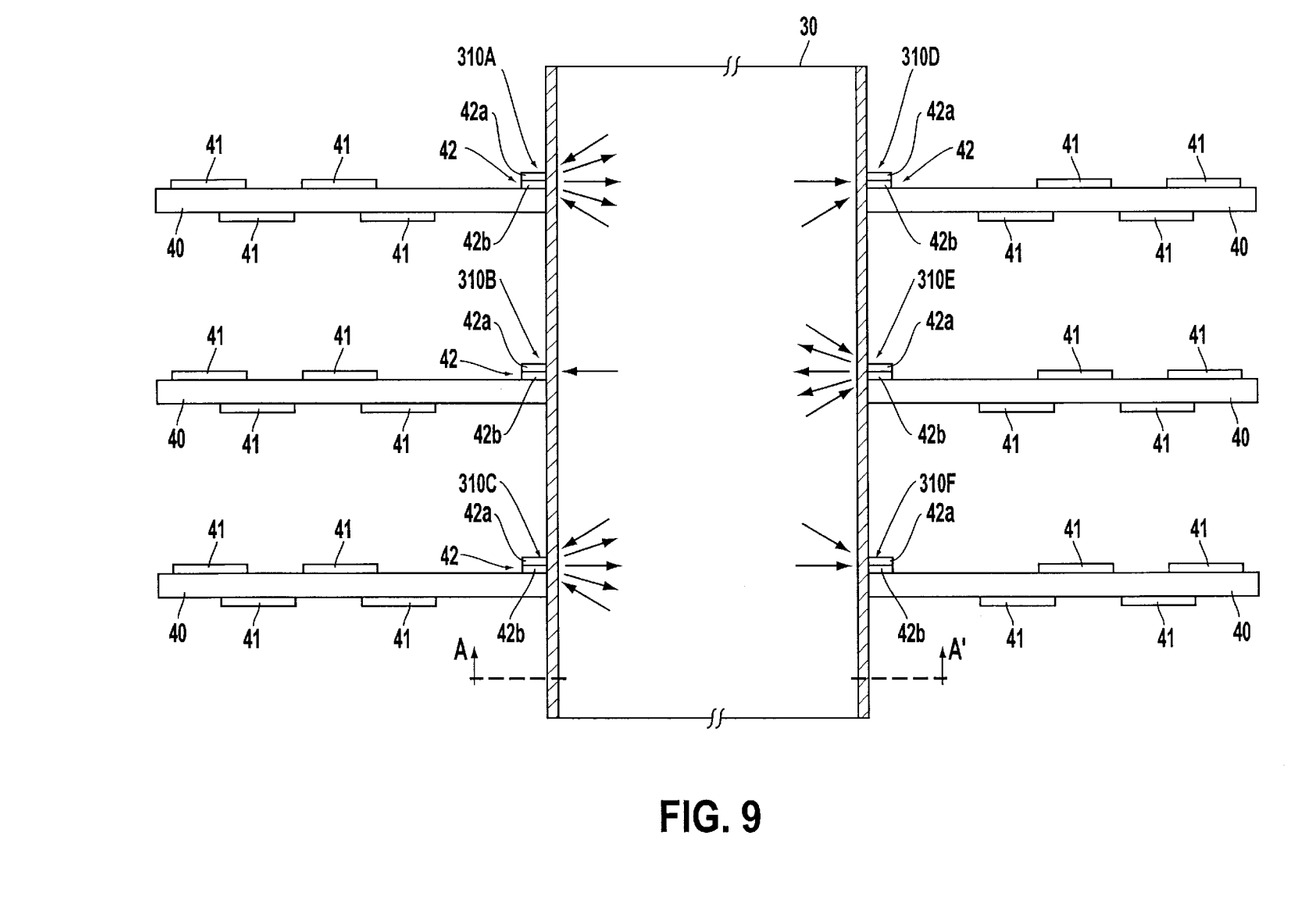
FIG. 9 is a schematic diagram showing the optical-signal transmission apparatus according to a third embodiment of the present invention.
Figure 10:
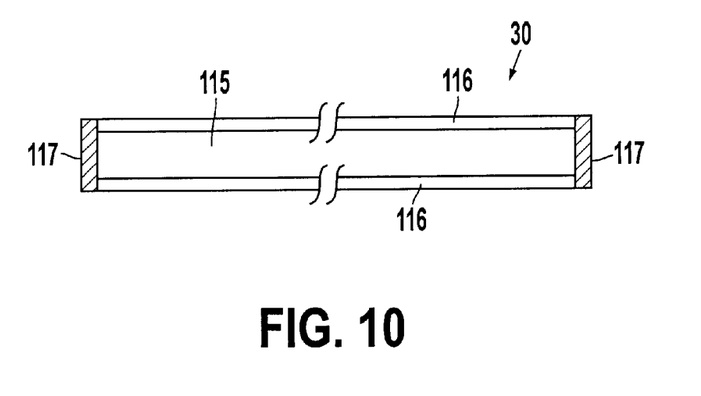
FIG. 10 is a cross-sectional view cut along an arrow A–A' in FIG. 9.

FIG. 9 is a schematic diagram showing the optical-signal transmission apparatus according to a third embodiment of the present invention. FIG. 10 is a cross-sectional view of the optical transmission medium cut along an arrow A–A' in FIG. 9. The optical-signal transmission apparatus according to the third embodiment of the present invention will be described with reference to FIGS. 9 and 10.

In the third embodiment, a sheet type optical transmission medium 30 is employed. Further, all the nodes 310A to 310F function as transmission nodes and reception nodes. In this embodiment, electronic circuit parts 41 are packaged on circuit boards 40, and communication is performed by using optical transceivers 42. Each optical transceiver 42 has a transmitter 42A and a receiver 42B arranged closely to each other. An arrow within the optical transmission medium 30 (see FIG. 9) represents an optical signals after light diffusion.

The optical transmission medium 30 in FIG. 9, having the nodes 310A to 310F for introducing signal light from the transmitters 42A and transmitting signal light to the receivers 42B on end surfaces, transmits signal light introduced from nodes at the one end surface and outputs the signal light from nodes at the other end surface. As shown in FIG. 10, the optical transmission medium 30 has an optical transmission layer (core layer) 115 and a clad layer 116 covering the optical transmission layer (core layer) 115. On the end surface where the nodes for optical signal input/output are provided, a transmission diffusing member 117 is provided for transmitting optical signals introduced from the nodes towards the inside of the optical transmission medium 30 and diffusing the input optical signals.

The optical transmission layer (core layer) 115 is used for transmitting signal light. In the present embodiment, the material of the optical transmission layer 115 is a high-transmission PMMA (polymethyl methacrylate, refractive index: 1.49) sheet having a thickness of 0.5 mm. The sheet-type optical transmission layer (core layer) 115 is manufactured by cutting a PMMA sheet to a predetermined size and processing the sheet to a desired shape, or preparing a mold in advance, heating the mold to have a sufficiently high temperature to melt PMMA, and pouring PMMA sufficiently heated and in molten state into the mold.

The clad layer 116 is used for preventing leakage of optical signal within the optical transmission layer (core layer) 115 in a thickness direction. The material of the clad layer 116 has a refractive index lower than that of the optical transmission layer (core layer) 115. The clad layer 116 increases the optical-signal transmission efficiency. In the present embodiment, as PMMA is employed as the material of the optical transmission layer (core layer) 115, fluorine-containing polymer is preferably employed. To form the clad layer 116, the optical transmission layer (core layer) 115 may be coated with, e.g., a liquid state fluorine-containing resin material, or a sheet-shaped material may be formed on the optical transmission layer (core layer) 115 by heat pressing or the like. The refractive index of the fluorine-containing polymer is about 1.30 to 1.36. In the present embodiment, the refractive index of the fluorine-including polymer is 1.36.

As shown in FIG. 9, the transmission diffusing member 117 is provided on both end surfaces of the optical transmission layer (core layer) 115 to transmit and diffuse signal light transmitted in parallel to the optical transmission layer (core layer) 115. It is preferable that the transmission-diffusing member 117 has a high transmissivity with respect to optical signals from the transmitters 42A, as its performance. As the transmission diffusion member 117, an optical diffusion film material comprising an acrylic resin layer containing silica pigment, having a thickness of 10·m, on a polyester substrate having a thickness of 50·m is employed. A process to separate and extract a desired signal component from a reception signal obtained by the receiver 42B is similar to that in the first and second embodiments.

Figure 11:
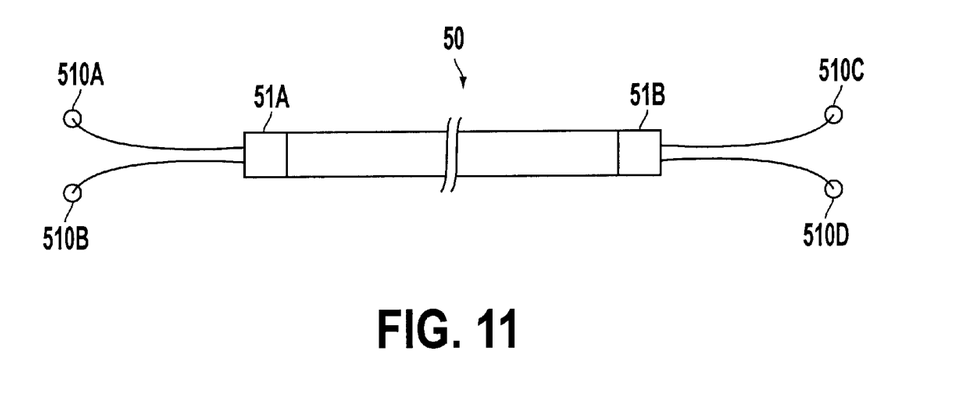
FIG. 11 is a schematic diagram showing the optical transmission medium of the optical-signal transmission apparatus according to a fourth embodiment of the present invention.

FIG. 11 is a schematic diagram showing the optical transmission medium according to a fourth embodiment of the present invention.

In the fourth embodiment, an optical fiber 50 is employed as the optical transmission medium.

The optical fiber 50 has four transmission/reception nodes 510A, 510B, 510C and 510D. When optical signals are introduced from two of the four nodes, 510A and 510B, the optical signals are combined by a wave combiner 51A, transmitted through the optical fiber 50, and transmitted via the other wave combiner (wave divider) 51B from the two transmission/reception nodes 510C and 510D. On the other hand, when optical signals are introduced from the two of the transmission/reception nodes 510C and 510D, the optical signals are combined by the wave combiner 51B, transmitted through the optical fiber 50, and transmitted via the wave combiner (wave divider) 51A from the two transmission/reception nodes 510A and 510B. The optical fiber 50 may be a single mode fiber or may be a multimode fiber. The optical guide paths to introduce the optical signals from the respective nodes 510A to 510D may be wave-guide paths, or may be other optical fibers. The optical guide paths are used for introducing optical signals from the plurality of nodes into the optical fiber or introducing a signal from the optical fiber to a plurality of nodes.

The method to receive optical signals transmitted from the respective nodes to obtain a reception signal, and to separate and extract a desired signal component from the reception signal is similar to that in the first and second embodiments.

Figure 12:
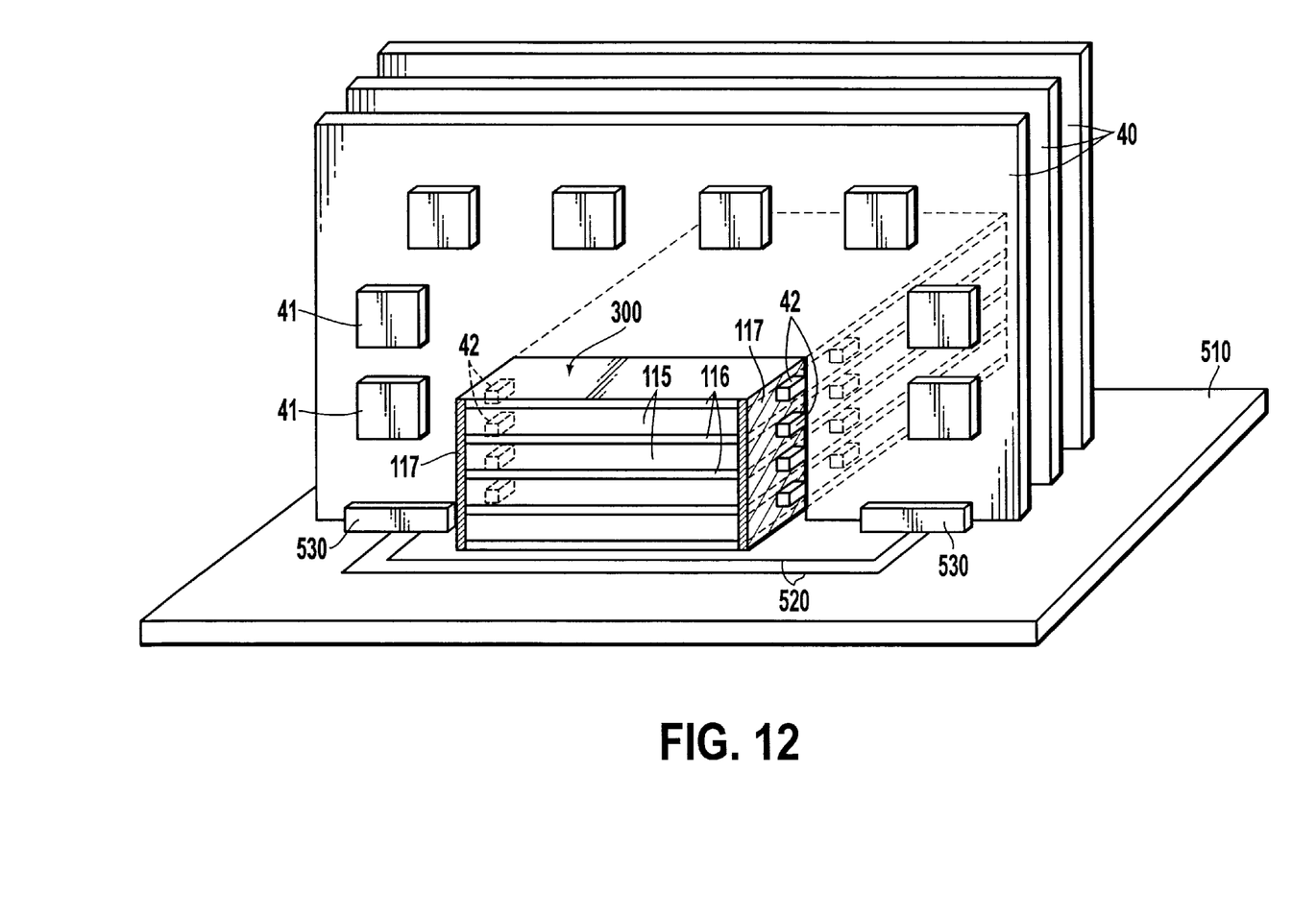
FIG. 12 is a perspective view showing an example of a signal processing apparatus of the present invention.

FIG. 12 is a perspective view showing an example of a signal processing apparatus of the present invention.

In FIG. 12, a signal processing apparatus 500 comprises a support substrate 510, an optical bus 300 as a kind of optical transmission medium, fixed on the support substrate 510, a wire 520 for electric signal transmission, provided on the support substrate 510, a plurality of circuit boards 40, and connectors 530, which are fixed on the support substrate 510 and which removably fix the circuit boards 40 and connect the wire 520 on the support substrate 510 to wires (not shown) on the circuit boards 40.

As shown in FIG. 12, the optical bus 300 has alternately deposited core layers 115 and clad layers 116, and has the transmission diffusing members 117 and nodes for optical-signal input/output, on both end surfaces.

The optical transceivers 42 are provided on the circuit boards 40 at positions corresponding to the respective nodes of the optical bus 300 of the respective core layers 115 when attached to the connectors 530. Further, the electronic circuit parts 41 are mounted on the circuit boards 40. The electronic circuit parts 41 respectively perform processing to generate an electric signal as a base of optical signal to be transmitted from the optical transceiver 42 and transmit the electric signal to the optical transceiver 42, processing to separate a desired signal component from the reception signal obtained by the optical transceiver 42, and other signal processings.

Note that all the circuit boards 40 in FIG. 12 function as a first circuit board and a second circuit board, however, the circuit boards 40 may be divided into a circuit board (first circuit board) side to perform processing for optical-signal transmission and a circuit board (second circuit board) side to perform processing for optical-signal reception.

In use of the signal processing apparatus 500 in FIG. 12, as the plurality of core layers 115 are deposited with the clad layer 116 therebetween, a plurality of optical transmission paths are formed. By controlling timings of data transmission via the plurality of optical transmission paths, the optical transmission paths function as an optical bus. Further, as the clad layer 116 is inserted between the two core layers 115, cross talk between the optical transmission paths can be prevented. Note that as the core layers 115 and the clad layer 116, the materials and manufacturing methods as described in FIGS. 9 and 10 can be used.

In use of the signal processing apparatus 500 in FIG. 12, the sheet-type optical transmission media are used, however, optical fibers may be employed as the optical transmission media.

The above-described embodiments employ the optical transmission medium to transmit light from one end to the other end, however, the optical transmission medium is not limited to this shape. The optical transmission medium may have a shape having no concept of "one end and the other end", i.e., a disk shape or spherical shape. Otherwise, even if the shape of the optical transmission medium includes the concept of "one end and the other end", one end may be mirror-coating processed such that an optical signal introuced from the other end is reflected and returned to the input-side end where the signal has been introduced, and the optical signal is received on the input-side end. That is, the shape of the optical transmission medium is not limited to a specific shape.

As described above, according to the present invention, optical signals having different light intensity levels are overlaid by using the same optical transmission medium and the multiplexed signal is transmitted, and the receiving side discriminates the plurality of signals from the overlaid signals. Accordingly, a number of terminals (apparatuses, circuit boards and the like) can be connected, and communication freedom among the terminals can be improved.

As many apparently widely different embodiments of the present invention can be made without departing from the spirit and scope thereof, it is to be understood that the invention is not limited to the specific embodiments thereof except as defined in the appended claims.

What is claimed is:

1. An optical-signal transmission apparatus comprising:
   an optical transmission medium that transmits an optical signal, having a plurality of transmission nodes to input signal light into said optical transmission medium and at least one reception node to output an optical signal from said optical transmission medium;
   a plurality of optical-signal transmission units, provided in correspondence with said respective transmission nodes, that respectively generate an optical signal and input the generated optical signal from the corresponding transmission node into said optical transmission medium, and generate pulse string optical signals having different light intensity levels among a plurality of optical-signal transmission units; and
   an optical-signal reception unit, provided in correspondence with said reception node, that obtains a reception signal by obtaining the optical signal transmitted from said reception node, and separates a signal component corresponding to an optical signal generated by a desired optical-signal transmission unit, from among a plurality of signal components corresponding to the plurality of optical signals generated by said optical-signal transmitting units, included in the obtained reception signal.

2. The optical-signal transmission apparatus according to claim 1, wherein said optical-signal transmission units can freely change the light intensity levels of the optical signals generated by said optical-signal transmission units, and
   wherein said apparatus further comprises an arbitration unit that performs arbitration among said plurality of optical-signal transmission units such that light intensity levels of the optical signals generated by said optical-signal transmitting units are different from each other.

3. The optical-signal transmission apparatus according to claim 1, further comprising an intensity-level notification unit that notifies said optical-signal reception unit of the light intensity levels of the optical signals generated by said optical-signal transmission units, prior to generation of the optical signals by said optical-signal transmission units.

4. The optical-signal transmission apparatus according to claim 1, wherein said optical transmission medium is an optical fiber, and
   wherein said apparatus further comprises a wave combiner that overlays the plurality of optical signals introduced from said plurality of transmission nodes and transmits the overlaid optical signal into said optical fiber.

5. The optical-signal transmission apparatus according to claim 1, wherein said optical transmission medium is a sheet of optical transmission medium, and
   wherein said apparatus further comprises a light diffusion unit that diffuses the optical signals introduced from said transmission nodes and transmits the diffused optical signals into said sheet of optical transmission medium.

6. The optical-signal transmission apparatus according to claim 1, wherein said optical-signal reception unit separates a desired signal component by comparing time-sequential signal levels of the signals received by said optical-signal reception unit with a plurality of threshold values.

7. An optical-signal transmission apparatus comprising:
   an optical transmission medium that transmits signal light, having at least one transmission node to input signal light into said optical transmission medium and a plurality of reception nodes to output signal light from said optical transmission medium;
   an optical-signal transmission unit, provided in correspondence with said transmission node, that simultaneously generates a plurality of pulse string optical signals having different light intensity levels or generates a multiplex pulse string optical signal where a plurality of pulse string optical signals having different light intensity levels are overlaid, and inputs the optical signals or multiplex optical signal from the corresponding transmission node into said optical transmission medium; and an optical-signal reception unit, provided in correspondence with said respective reception nodes, that obtains a reception signal by obtaining the optical signals or multiplex optical signal transmitted from a corresponding reception node, separates a signal component corresponding to an optical signal generated by a desired optical-signal transmission unit, from a plurality of signal components corresponding to the plurality of optical signals generated by said optical-signal transmission unit, included in the obtained reception signal.

8. The optical-signal transmission apparatus according to claim 7, further comprising an intensity-level notification unit that notifies said optical-signal reception unit of the light intensity levels of the optical signals to be newly generated by said optical-signal transmission unit, prior to generation of the optical signals by said optical-signal transmission unit.

9. The optical-signal transmission apparatus according to claim 7, wherein said optical transmission medium is an optical fiber, and wherein said apparatus further comprises a wave divider that divides the optical signal introduced from said transmission node and transmits the divided optical signals to said plurality of reception nodes.

10. The optical-signal transmission apparatus according to claim 7, wherein said optical transmission medium is a sheet of optical transmission medium, and wherein said apparatus further comprises a light diffusion unit that diffuses the optical signal introduced from said transmission node and transmits the diffused optical signals into said sheet of optical transmission medium.

11. The optical-signal transmission apparatus according to claim 7, wherein said optical-signal reception unit separates a desired signal component by comparing time-sequential signal levels of the signals received by said optical-signal reception unit with a plurality of threshold values.

12. A signal processing apparatus comprising:

an optical transmission medium that transmits signal light, having a plurality of transmission nodes to input signal light into said optical transmission medium and at least one reception node to output an optical signal from said optical transmission medium;

a first circuit board carrying a plurality of optical-signal transmission units that respectively emit an optical signal, and simultaneously generate a plurality of pulse string optical signals having different light intensity levels or generate a multiplex pulse string optical signal where a plurality of pulse string optical signals having different light intensity levels are overlaid;

a second circuit board carrying an optical-signal reception unit that obtains a reception signal by receiving the optical signals or multiplex optical signal, and separates a signal component corresponding to an optical signal generated by a desired optical-signal transmission unit, from among a plurality of signal components corresponding to the plurality of optical signals generated by said plurality of optical-signal transmission units, included in the obtained reception signal;

a support member that supports said first circuit board and said second circuit board positioned with respect to said optical transmission medium such that the optical signals generated from said optical-signal transmission units on said first circuit board are introduced from said transmission nodes into said optical transmission medium and signal light transmitted from said reception node is transmitted into said optical-signal reception unit on said second circuit board.

13. A signal processing apparatus comprising:

an optical transmission medium that transmits signal light, having at least one transmission node to input signal light into said optical transmission medium and a plurality of reception nodes to output signal light from said optical transmission medium;

a first circuit board carrying an optical-signal transmission unit that simultaneously generates a plurality of pulse string optical signals having different light intensity levels or a multiplex pulse string optical signal where a plurality of pulse string optical signals having different light intensity levels are overlaid, and outputs the optical signals or multiplex optical signal;

a second circuit board carrying a plurality of optical-signal reception units that obtain a reception signal by receiving the optical signals or multiplex optical signal, and separate a signal component corresponding to a desired optical signal from among a plurality of signal components corresponding to the plurality of optical signals, included in the obtained reception signal;

a support member that supports said first circuit board and said second circuit board positioned with respect to said optical transmission medium such that the optical signals generated from said optical-signal transmission unit on said first circuit board are introduced from said transmission node into said optical transmission medium and the signal light transmitted from said reception nodes is transmitted into said optical-signal reception units on said second circuit board.

* * * * *